United States Patent [19]

Spickelmire

[11] Patent Number: 5,355,615
[45] Date of Patent: Oct. 18, 1994

[54] FISH LINE RUDDER DEVICE WITH STABILIZER

[75] Inventor: W. James Spickelmire, Grangeville, Id.

[73] Assignee: Gem Tackle Company, Grangeville, Id.

[21] Appl. No.: 928,788

[22] Filed: Aug. 12, 1992

Related U.S. Application Data

[63] Continuation-in-part of Ser. No. 747,525, Aug. 20, 1991, Pat. No. 5,165,196, which is a continuation-in-part of Ser. No. 530,067, May 29, 1990, Pat. No. Des. 330,752.

[51] Int. Cl.$^5$ ............................................. A01K 95/00
[52] U.S. Cl. ..................................................... 43/43.13
[58] Field of Search ................... 43/43.12, 43.13, 44.88, 43/44.9

[56] References Cited

U.S. PATENT DOCUMENTS

| | | | |
|---|---|---|---|
| D. 217,644 | 5/1970 | Smith | 43/43.13 |
| 1,320,804 | 11/1919 | Squarebriggs | 43/43.13 |
| 2,255,465 | 9/1941 | Hickey | 43/49 |
| 2,412,399 | 12/1946 | Henricks | 43/43.13 |
| 2,566,029 | 8/1951 | Louthan | 43/43.13 |
| 2,605,577 | 8/1952 | Waugler | 43/43.13 |
| 2,726,475 | 12/1955 | Wiselka | 43/43.13 |
| 2,741,863 | 4/1956 | Magill | 43/43.13 |
| 2,749,651 | 6/1956 | Snider | 43/43.13 |
| 2,798,331 | 7/1957 | Westdahl | 43/43.13 |
| 2,814,903 | 12/1957 | Banowetz | 43/43.13 |
| 2,843,966 | 7/1958 | Ingram et al. | 43/43.13 |
| 2,920,414 | 1/1960 | Koepplin | 43/43.13 |
| 3,524,277 | 8/1970 | Neubert | 43/43.13 |
| 3,568,355 | 3/1971 | Hassell | 43/43.13 |
| 3,940,871 | 3/1976 | Evans | 43/43.13 |
| 4,567,687 | 2/1986 | Even | 43/43.13 |
| 4,619,070 | 10/1986 | Jung | 43/43.13 |
| 4,879,834 | 11/1989 | Bohme | 43/43.12 |

Primary Examiner—Kurt C. Rowan
Attorney, Agent, or Firm—Wells, St. John, Roberts, Gregory & Matkin

[57] ABSTRACT

A fish line rudder facilitates carrying a fish line in current to either or both sides of a boat, or guiding the fish line laterally to current flow within a stream. The rudder includes an elongated body with opposed arcuate wing members. Top and bottom central radial rudder plates extend axially along the body between the two wing members. The body includes flotation at a forward section thereof. Line receivers are mounted near forward and rearward body ends, to slidably receive the fish line therethrough and define an axial "way" along the top side of the body. A line grip, on the bottom side of the body releasably secures a point along the fish line extending forwardly of the forward line receiver. The line extends forwardly from the grip to the fish pole and rearwardly from the grip through the way, to a hook. When in the water, the device will react to resistance offered by the fish line, to move the fish line laterally across current, to locate the fish line according to the fisherman's desire. The fish line can be manipulated to cause the device to shift positions and move back and forth as desired in the current. The gripped section of the fish line can be released by a sudden tug, as when a fish bites. The rudder aligns with the fish line, allowing the fish to be played without the rudder device offering significant resistance.

19 Claims, 5 Drawing Sheets

FIG. 1

FISH LINE RUDDER DEVICE WITH STABILIZER

RELATED APPLICATIONS

This application is a continuation-in-part of U.S. Pat. No. 5,165,196, issued Nov. 24, 1992, which is a continuation-in-part of Ser. No. 530,067, filed May 29, 1990 now U.S. Pat. No. Des. 330,752, issued Nov. 24, 1992.

TECHNICAL FIELD

The present invention relates to apparatus attachable to fishing lines for the purpose of carrying the fishing line to one side of a boat or to a selected lateral position within a stream, and more particularly to such a device that will facilitate movement in opposed lateral directions within a water current, especially in turbulent water.

BACKGROUND OF THE INVENTION

It is desirable when fishing from a boat or a stream, to place the bait at a desired location within the current or water behind the moving boat. To this end, various apparatus have been developed to facilitate movement of the bait in response to forward motion of the boat or water current.

My co-pending U.S. patent application serial no. 747,525, now U.S. Pat. No. 5,165,196 filed Aug. 20, 1991 discloses a fish line rudder device for selectively moving a fish line laterally in a current. The rudder device described and claimed in my co-pending application answers the need for a fish line guiding device and is especially maneuverable in water currents where there are no large waves or swells. It has been found, though, that control is difficult to maintain where large waves tend to alternately pull the fish line taut and allow it to go slack. A further need has thus been realized for a device with qualities similar to those disclosed in my co-pending application, but that will operate effectively in rough water, such as often experienced in ocean fishing.

Other apparatus have been developed in attempts at guiding fishing lines.

U.S. Pat. No. 2,605,577 to Waugler shows a fish line sinker with an elongated body, a fish line receiving bore between a pair of lateral wings, and opposed rudder plates. However, no disclosure is made of a line clamping device that would permit selective release of the guide to slide along the line after a fish bites, or for providing guiding stability to hold the body in a selected attitude with respect to the fisherman's pole, especially in rough, choppy water. Rather, the Waugler device is simply a winged sliding sinker.

U.S. Pat. No. 2,255,465 to Hickey discloses form of fish line guiding float. This float is provided with features to facilitate a "zig-zag" motion to lateral sides of a boat or other appropriate station. The float moves angularly against the current to pull the fish line to one side of the fisherman. In order to switch directions, the user must "whip the line" in order to move a ring that slides along a longitudinal rod on the float to shift the direction of pull and alter the angular orientation of the float. No disclosure is made of an apparatus for releasing the float from its angular orientation to allow normal play and landing of a fish.

A directional float apparatus is described in U.S. Pat. No. 2,798,331 to Westdahl. This device is described as a trolling float and basically represents an obstruction that is held angularly against the current, from the shore or from a moving boat. The angular orientation of the float relative to the fish line, causes the float to move in a laterally outward direction, away from the boat or the user's station along the shore of a moving body of water. The amount and direction of lateral travel is determined by the side of the device to which the line is attached.

Alternate motion of the float to an opposite direction is facilitated by adjustment features on the float. The line may be connected to either lateral side of the float to influence movement of the float in opposed directions behind the trolling boat or from the shore. However, to facilitate the change in direction, the float must first be pulled in and the line re-connected by the user.

The Westdahl float also includes a line release arrangement that facilitates release of the float from its normal relatively stationary position along the fish line in response to a "bite" or tug from the bait end of the fish line. Once the float is freed to turn with the current, the line straightens and the float slides along the length of the line toward the bait end.

U.S. Pat. No. 3,524,277 to Neubert discloses a trolling device with a line release mechanism. This trolling device is used, as are others, for drawing the fishing line to a location substantially "normal to the direction of current flow." A rearward end of the device includes a line release mechanism, and wings to opposed sides of a central vane include holes which the fish line is threaded through. The device will carry the bait out into the current. When a fish strikes the bait, the line will be released and the device will slide freely along the line to facilitate retrieval of the fish.

Either of the selected holes on the side wings of the Neubert device must be used in to facilitate an alternate direction of movement for the device. Once the fish line is secured through one of the holes, the direction is determined and cannot be changed without disconnecting the line and rethreading it through the opposite hole.

Though the above apparatus work to varying degrees, there remains a need for a fish line rudder that will allow a fisherman the alternative of movement in opposed lateral directions with respect to current flow direction in rough, choppy water.

BRIEF DESCRIPTION OF THE DRAWINGS

A preferred embodiment of the invention is described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Pat. No. Laws "to promote the progress of science and useful arts" (Article 1, Section 8).

A rudder exemplifying preferred features of the present invention is illustrated in the drawings and is generally designated therein by the reference character 10. The present rudder 10 is provided to facilitate movement or guiding of a fishing line 11 (FIGS. 1, 7) in prescribed lateral directions in relation to a current.

Figure 7:
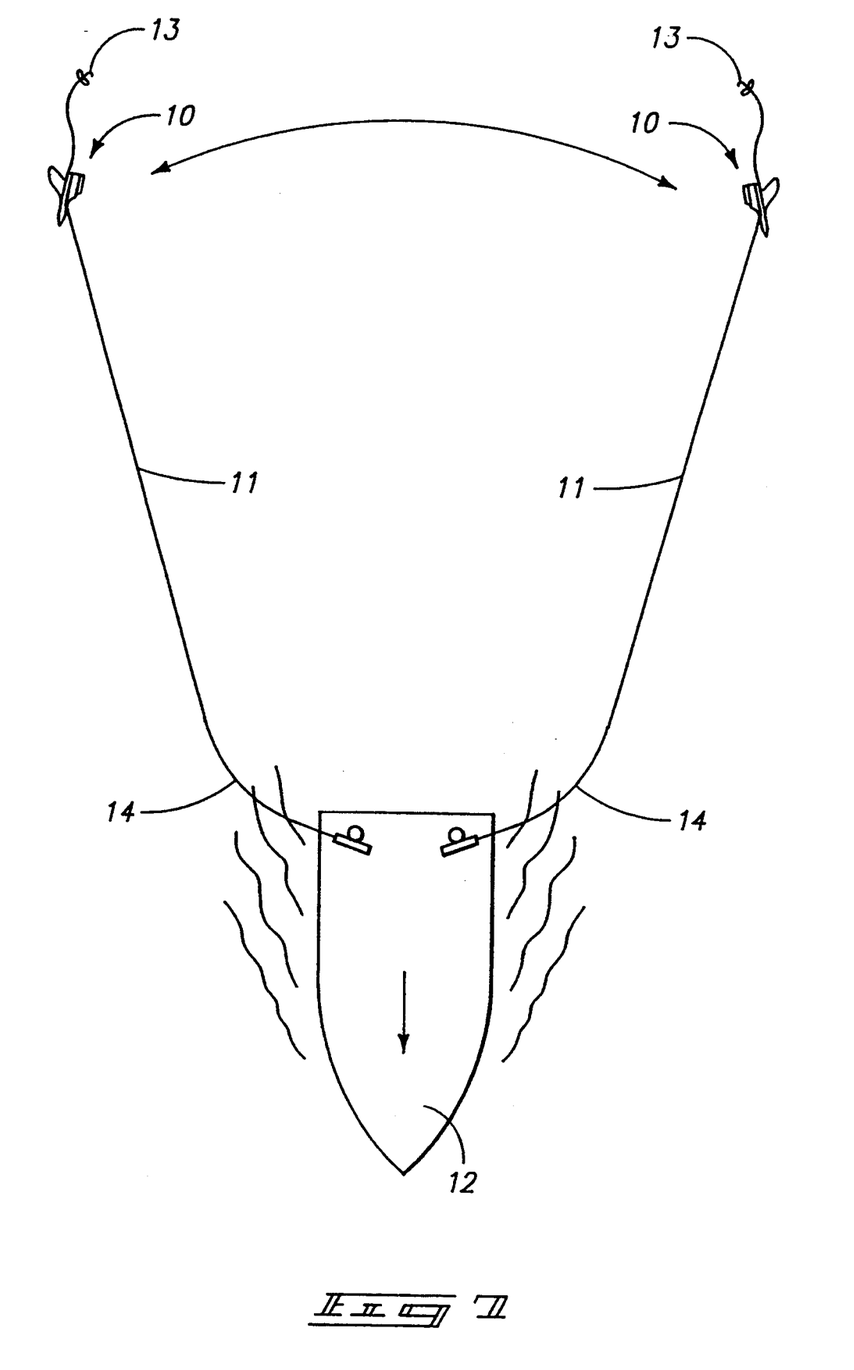
FIG. 7 is a diagrammatic view illustrating motion of the present rudder behind a boat.

The current may be established in still water by a forwardly moving boat 12, or by the flow of water as in a stream. The present rudder 10 operates within the current flow to carry the fishing line 11 and hook 13 laterally across the current as desired by the user holding a common fishing pole 14 or other line retrieving device. When fishing from a boat 12 as indicated in FIG. 7, the user may selectively change the lateral position of the fishing line between the position substantially shown. The fisherman is thus able to "zig-zag" the bait back and forth as desired, or otherwise place the bait wherever desired within a range determined only by the fish line length and the current (or boat) direction.

Figure 5:
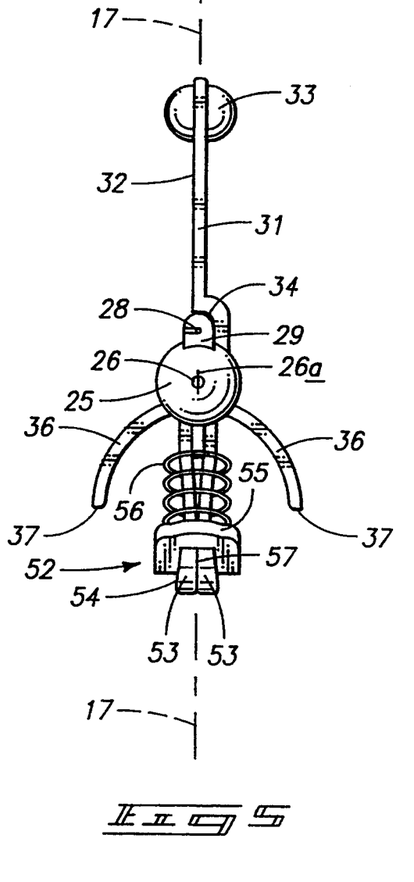
FIG. 5 is a front end view.
Figure 6:
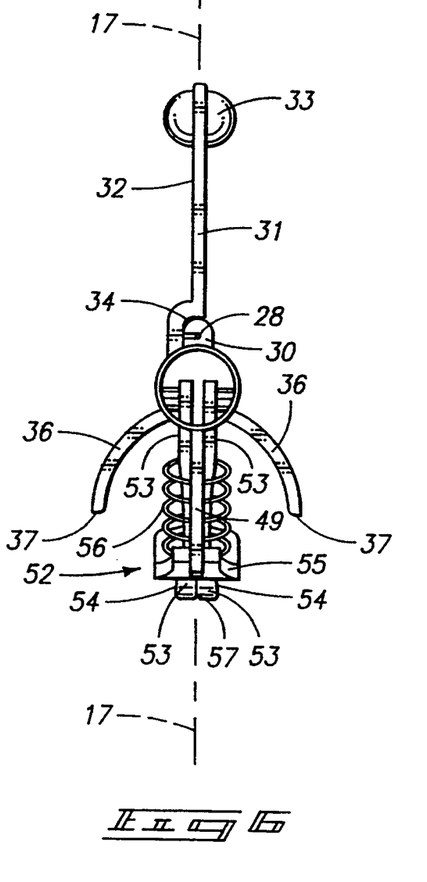
FIG. 6 is a rear end view.

The present rudder 10, in a preferred form, includes an elongated body 15. In the preferred form, the body 15 is constructed as a hollow plastic member of solid material. It extends along a central reference axis 16 (FIG. 3) and it has substantially bilateral symmetry to opposed sides of a vertical central reference plane 17 (FIGS. 5 and 6).

The central axis 16 is a reference used for descriptive purposes and lies within the vertical central reference plane 17, which is also used for descriptive purposes herein.

The elongated body 15 includes a bottom side surface 20 and a top side surface 21. The "top" and "bottom" are terms used with respect to the drawings to aid this description. Actual orientation of the rudder in use varies.

The surfaces 20, 21 together form a substantially tubular section in the preferred body configuration, leading from a rearward end 24 to a forward tapered section 25. The forward tapered section 25 leads on forwardly to a reduced front end 26. A slit 26a is provided at the front end 26 to receive and position fishing line with respect to line guide and gripping means (described in detail below) that are located on opposite top and bottom side surfaces of the body.

Figure 3:
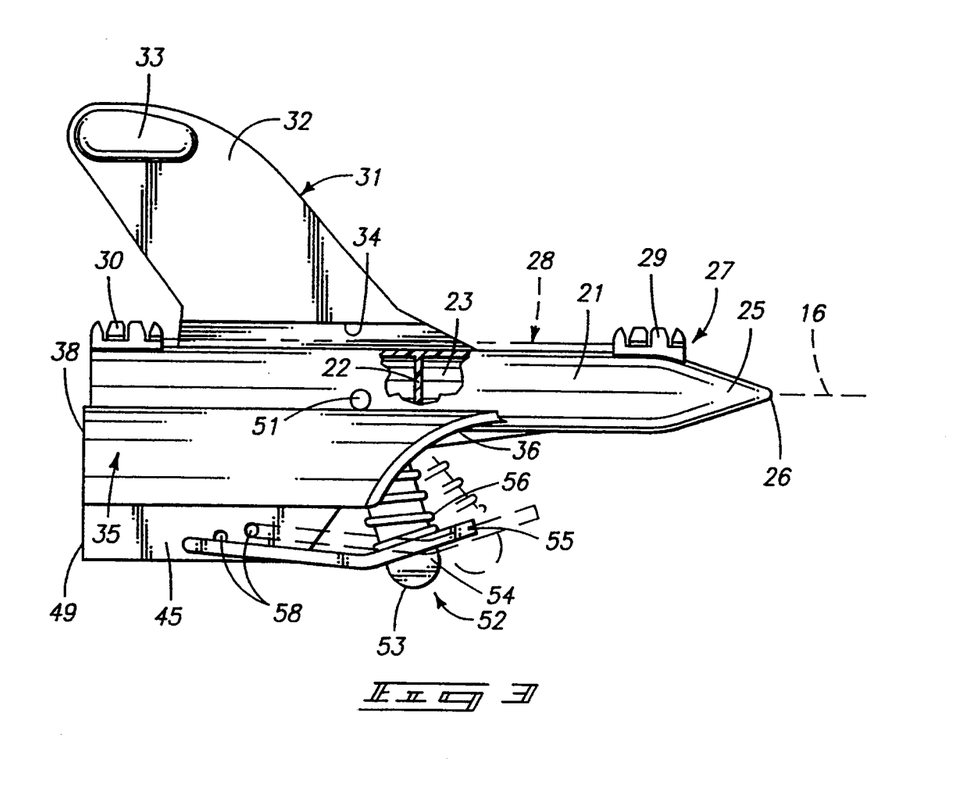
FIG. 3 is a side elevation view.

The body includes a forward buoyant section that is advantageously provided with flotation 23. The flotation 23 in the first preferred form, extends from the reduced front end 26 rearwardly to a closed end 22 that is located approximately half way along the length of the body. Flotation 23 may alternatively be a sealed air cavity within the body adjacent the front end (as shown in FIG. 3), or a similar space filled with a buoyant material such as foamed or expanded bead plastic.

The flotation 23 is provided in the forward area of the body to assure buoyancy in turbulent water, and to hold the device "nose up" in the water to avoid diving during use.

The body 15 includes a opposed fish line receiving and guiding means 27 along its length. Means 27 is, in a preferred form, provided as a forward line receiver 29 and a rearward line receiver 30. Both receivers 29, 30 are identical and are mounted to the guide body to slidably hold an engaged section of line therebetween along a "way" 28 or longitudinal opening that is substantially parallel to the long axis 16 of the body.

The receivers 29, 30 include opposed, longitudinally spaced line guide hooks that alternately laterally overlap the slide way 28. The fish line may be threaded from the slit 26a over the hooks and into the slide way 28 in such a manner that the line is slidably received along the way 28 through the spaces between the opposed hooks. The receiver hooks will freely allow such sliding but will prevent the line from being unintentionally dislodged laterally from the body. The slit 26a will prevent the line loop ahead of the receiver hooks from shifting to either lateral side of the body.

The receivers 29, 30 are located at opposite ends of the body 15 along the top surface 21 to define the slide way 28. In referring to FIGS. 5 and 6, it will be seen that, in the preferred example, the way 28 is substantially parallel to the central axis 16 of the body 15. Further, the way 28 is formed along an axis as shown in FIG. 3 that is advantageously located within the vertical central reference plane 17.

A top stabilizer rudder 31 is mounted to the top surface 21 of the body 15. Rudder 31 projects radially in the vertical reference plane 17 to an upper end 32. In the preferred form, a float 33 is provided at the upper rudder end 32. The rudder 31 plays an important role in stabilizing the device in rough water. It has been found that the rudder 31 and float 33 aid in maintaining the device in the various operational positions while preventing the device from flipping over onto the top side 21.

The rudder 31 is formed in a smooth fin-shaped curve and extends longitudinally along the body from the rearward receiver 30 toward the forward receiver 29. A longitudinal groove 34 is provided along the rudder 31 near its base to provide clear space for the fish line when slidably mounted along the way 28.

A pair of elongated wings 35 extend in opposed directions outwardly from the body 15. The wings 35, in the example shown, are arcuate in cross-section (FIGS. 6 and 7) leading outwardly and downwardly from the body 15 to axial side edges 37. As may be seen in FIGS. 5 and 6, the wings 35 are substantially bilaterally symmetrical to the central vertical reference plane 17.

The wings include forward tapered sections 36 that lead along smooth curved edges inwardly and forwardly in a direction toward the body forward tapered section 25. These edge sections 36 are clearly shown in FIGS. 1-4 of the drawings.

The tapered sections 36 lead rearwardly to axial side edges 37. The edges 37 are substantially parallel to one another and to the central longitudinal axis 16. They lead rearwardly from the tapered forward sections 36 to rearward ends 38.

The arcuate wings each include a bottom concave surface configuration 40, and an upwardly facing convex surface 39. The surfaces 39, 40 may be substantially concentric in cross section (FIG. 5) such that the thickness dimension of the wings between the two surfaces 39, 40 is consistent along the length of the wings.

A bottom rudder plate 45 extends radially from the body 15 with respect to the central axis 16. The bottom rudder plate 45 helps to maintain the body 15 in a desired orientation in the water to facilitate use. The bottom rudder plate 45 is substantially centered and bilaterally symmetrical along the vertical central reference plane 17 as indicated in FIGS. 5 and 6.

The bottom rudder plate 45 extends to a bottom axial edge 47 leading from a tapered front section 48 to a square rearward edge 49. Rearward edge 49, along with the rearward ends 38 of the wings, lie adjacent to the rearward end 24 of the body 15, in a plane transverse to the vertical central reference plane 17 as clearly shown in FIGS. 2-4.

The present fish line rudder also includes a line grip means 52 for releasably securing a fish line therein. Line grip means 52 in the preferred embodiment shown, is mounted to the bottom rudder plate 45. The line grip means 52 determines the position or point along the body 15 from which the line pulls and thereby affects the attitude of the body 15 in the water.

In a preferred form, the line grip means 52 includes a pair of clamp members 53 with upper ends pivotably mounted at 51 (FIG. 3) to the body 15. The pivot 51, transverse to the vertical central plane 17, is provided to allow forward and rearward adjustment of the grip means 52 to permit axial adjustment of the point from which the fish line pulls the device through the water. The pivot 51 also permits the clamp members to be spread laterally.

Lower clamp member ends are formed with outwardly facing cam surfaces 54. A spring biased keeper 55 is pivotably mounted on a transverse pivot axis at a rearward keeper end to the bottom rudder plate 45. The keeper 55 includes an aperture or socket at its forward end, slidably receiving the cam surfaces 54 of clamp members 53. A spring 56 urges the walls of the keeper socket against the cam surfaces 54 to releasably hold opposed clamp surfaces 57 of the clamp members 53 together along the central vertical plane 17 of the body 15.

Figure 4:
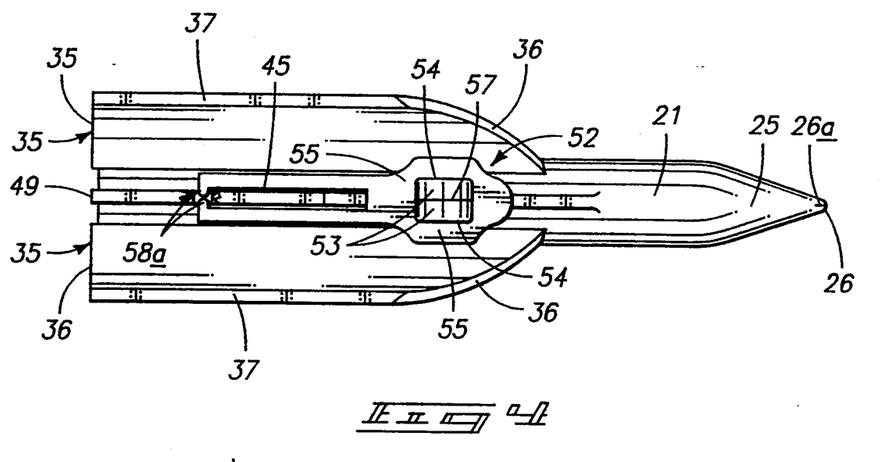
FIG. 4 is a bottom plan view.

The keeper is provided with adjustment means which, in the preferred form shown in FIG. 3, includes several keeper mounting pivot holes 58 that will selectively receive and pivotably mount the rearward end of the keeper. The holes 58 selectively and pivotably receive tabs 58a at the rearward ends of the keeper 55 (FIG. 4). The rearward end of the keeper may be sprung apart, pulling the tabs 58a from the holes 58 and repositioned so the tabs will spring into selected holes 58, thereby selectively adjusting longitudinal positioning of the pivotal clamp members 53 along the length of the body 15.

The holes 58 are spaced apart longitudinally to locate the clamp members 53 at different pivoted pulling point positions, according to the user's preference and according to the amount of weight or drag to be carried at the hook end of the fish line. Examples of extreme longitudinal positions of the clamps are shown by solid and dashed lines in FIG. 3.

The clamp surfaces 57 are arranged to grip and releasably hold a fish line at a location longitudinally along the body 15 rearward of the reduced front end 26. The keeper 55 may be moved upwardly against the spring bias, to allow the clamp members to part and to receive a part of the fish line between the clamp surfaces 57, along the central vertical plane 17.

Figure 1:
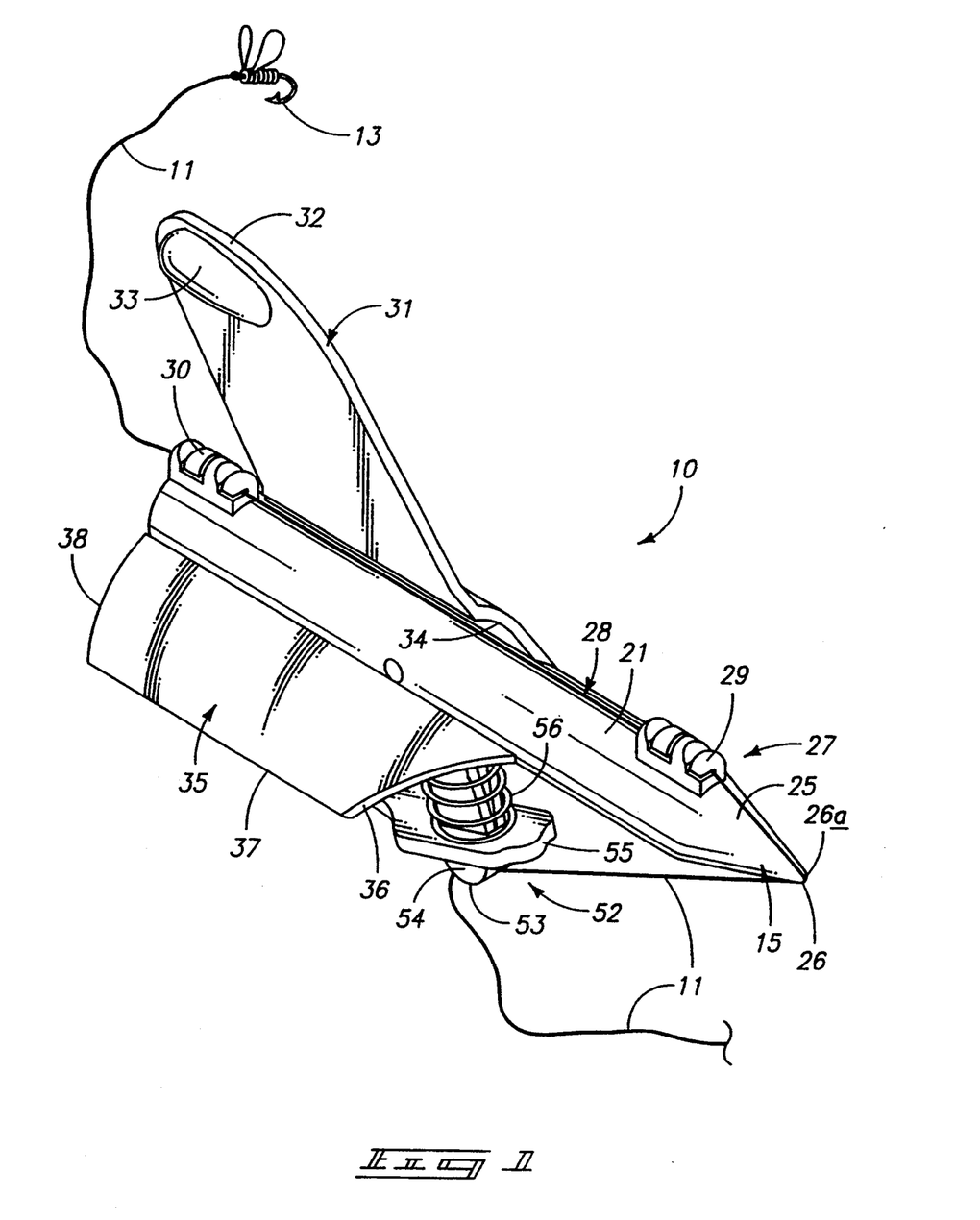
FIG. 1 is a top perspective view of a fish line rudder exemplifying features of the present invention.

The clamp members, with the clamp surfaces 57 on the vertical central plane, will release the fish line upon a rearward tug from the baited end of the line (FIG. 1). The released line will also slip from the front slot 26a and then slide freely through the way 28. The device will then align itself with the line and offer little resistance as the line is reeled in.

Figure 8:
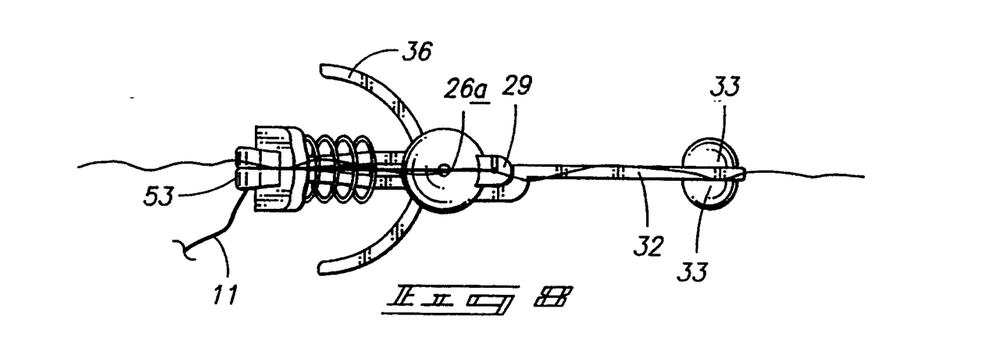
FIGS. 8–10 are diagrammatic operational views.

Operation of the present invention may best be understood with reference to FIG. 8, which diagrammatically illustrates a boat 12 moving in a forward direction as indicated by the arrows. A fishing line 11 extends from the boat 12 to the present rudder 10 and, from its connection to the rudder 10, to a hook 13.

Figure 2:
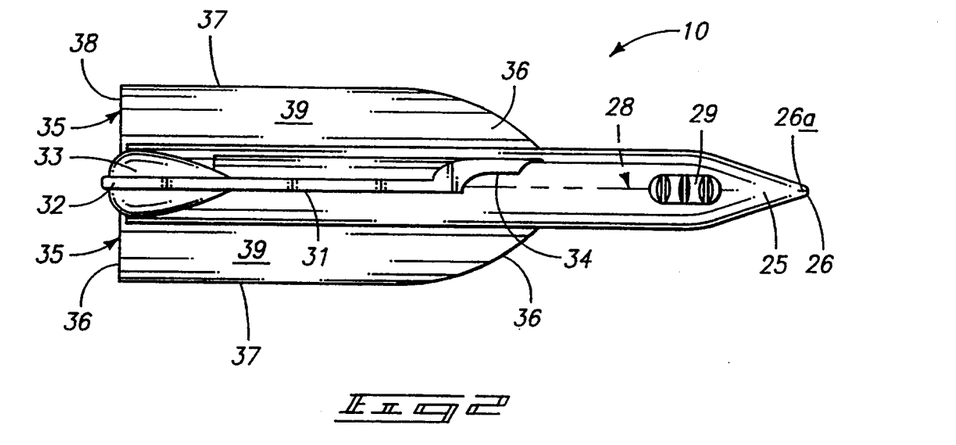
FIG. 2 is a top plan view.

The connection to the present rudder 10 is typical regardless of the intended orientation of the bait with respect to the forward direction of the boat, or the current flow. The correct connection to the fish line is shown in FIG. 2. As shown, the fish line is first threaded into the fish line guide receivers 29, 30 with the hook 14 spaced a desired distance behind.

The fish line, exiting from the forward receiver 29, is pulled into the forward slit 26a, to hold the line in alignment with the receiver 29, and to orient the line with respect to the grip means 52.

The fish line 11 is then trained from the slit 26a extends from the grip means 52. The keeper is lifted to allow the grip surfaces 57 to separate. The fish line is then passed between the surfaces and the keeper is allowed to move under spring tension downwardly, camming the clamp members together and gripping the line between the grip surfaces 57. The grip means 52 will releasably hold the guide at any selected point along the length of the line.

The configuration of the present rudder device 10 and location of the line grip means 52 with its clamp surfaces 57 on the vertical plane 17 assures that the device will move to one or the other lateral sides of the boat or shore, depending upon the initial angular orientation of the device in relation to the current.

Figure 9:
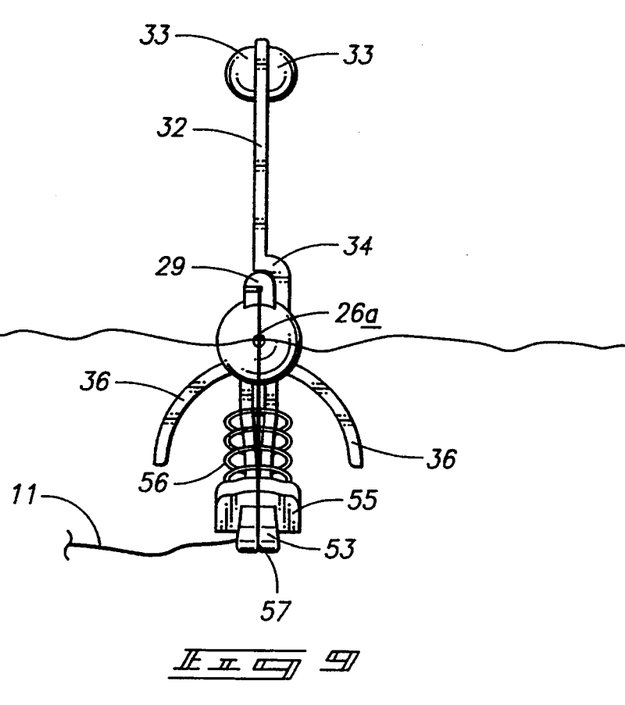
Figure 10:
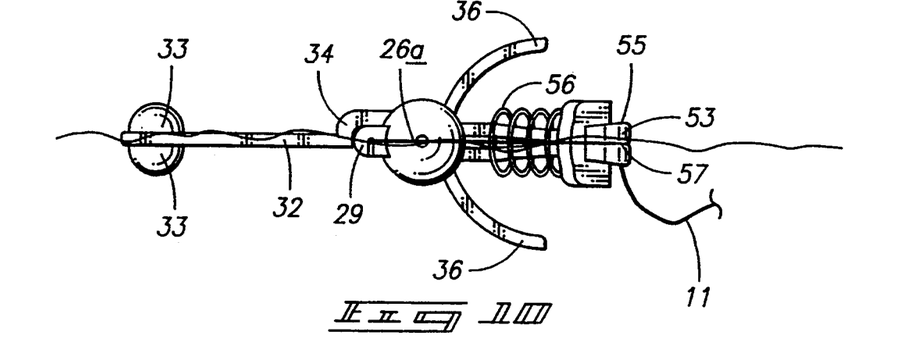

By tipping the device to one side (see for example FIG. 9), and applying a constant resistance to lateral motion of the device, the fisherman is able to guide his hook 13 to one side. Then, if it is desired to cause the device to move to the opposite side, the fisherman will pull in the line and then suddenly release it or otherwise cause the line to temporarily go slack. This allows the device to roll about its axis and temporarily align itself with the current (see FIG. 10). As the slack is taken up, the shifted rudder device will move in a direction opposite to the initial direction of movement.

Practice will develop a "feel" for the above procedure. By selectively alternating this procedure, the fisherman will be able to accurately place the bait nearly anywhere within range of the line length and in any water where there is current or motion of a boat. During use, the top rudder and float function to stabilize the device, holding it in the desired orientation and preventing it from rolling over unintentionally. This is important, especially in rough water where waves have the tendency to pull the line taut and subsequently let it go slack.

The line grip means 52 will selectively release the line either upon a sudden tug on the fishing line as applied by the fishing pole, or upon a fish biting the bait. The fish will apply tension along the line and cause the line to dislodge from the line grip means 52. This allows the fish line to extend in a relatively straight line and for the device to align itself with the straightened line substantially coaxial with the way 28. The device 10 will then slide down to a pre-positioned stop, such as a bead or swivel (not shown) along the line, if one is s provided. The fisherman is then able to pull the fish in without significant additional resistance offered by the device 10.

Once the line is reeled in, the device can be reset simply by connecting the fish line once again to the line grip means 52. The device is once again ready for use.

In compliance with the statute, the invention has been described in language more or less specific as to general features. It is to be understood, however, that the invention is not limited to the features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fish line rudder device, comprising:
   an elongated body formed on a central axis and having a top side surface and a bottom side surface leading axially from a rearward end to a forward tapered section and a reduced front end;
   a fish line receiver defining an open line receiving way extending along an axis along the body on one side thereof, for slidably receiving a fish line therethrough;
   a top rudder member extending radially from the body and centered along a central longitudinal reference plane;
   a pair of elongated wings extending in opposed directions outwardly from the body to side edges, said wings extending axially between the forward section and the rearward end;
   a bottom rudder plate member extending radially from the body and centered on the central longitudinal reference plane;
   wherein the top and bottom rudder plates extend axially along the body between the pair of elongated wings; and
   line grip means adjacent the bottom side surface of the body for releasably receiving and securing a fish line therein.

2. The fish line rudder as claimed by claim 1 wherein the receiver is mounted on the top side surface and the line grip means is mounted adjacent the bottom side surface.

3. The fish line rudder as claimed by claim 1 wherein the top rudder includes a groove formed therein along the fish line receiving way.

4. The fish line rudder as claimed by claim 1 wherein the line grip means is situated on the rudder plate member axially between the forward and rearward bore openings and is comprised of clamp surfaces held in a normally closed position in the central longitudinal reference plane.

5. The fish line rudder as claimed by claim 1 wherein the grip means is located on the bottom rudder plate.

6. The fish line rudder as claimed by claim 1 wherein the grip means is comprised of a pair of grip members pivotably mounted at upper ends to the body, and including facing line gripping surfaces thereon.

7. The fish line rudder as claimed by claim 1 wherein the grip means is comprised of:
   a pair of grip members pivotably mounted at upper ends to the body;
   facing line gripping surfaces on the grip members;
   oppositely facing inclined cam surfaces on the grip members
   a keeper slidably receiving the grip members therein and engaging the inclined cam surfaces;
   and spring means for yieldably urging the keeper against the cam surfaces to yieldably hold the grip members in a closed position.

8. The fish line rudder as claimed by claim 1 wherein the axis of the way, the central axis and the top and bottom rudder plates are situated within the longitudinal central reference plane.

9. The fish line rudder as claimed by claim 1 wherein the wings are of matched arcuate configuration in cross section, each with a concave surface facing downwardly and convex surface facing upwardly, and wherein the top and bottom rudders are substantially planar.

10. The fish line rudder as claimed by claim 1 wherein the body includes a buoyant section adjacent the forward end thereof, said buoyant section including flotation therein.

11. The fish line rudder as claimed by claim 1 wherein the top rudder includes a float at an outward end thereof.

12. The fish line rudder as claimed by claim 1 wherein the wings, the top and bottom rudder plates, and body rearward end terminate in a plane normal to the central reference plane.

13. The fish line rudder as claimed by claim 1 wherein the line grip means is comprised of clamp members movably mounted to the body rearward of the forward tapered section with cam surfaces thereon, and a spring biased keeper pivotably mounted to the bottom rudder and engaging the cam surfaces; and
   a spring means for biasing the keeper against the cam surfaces to yieldably urge the clamp members together.

14. The fish line rudder as claimed by claim 1 wherein the line grip means is comprised of clamp members pivotably mounted to the body rearward of the forward tapered section with cam surfaces thereon, and a spring biased keeper pivotably mounted to the bottom rudder and engaging the cam surfaces;
   a spring means for biasing the keeper against the cam surfaces to yieldably urge the clamp members together.

15. A fish line rudder, comprising:
   an elongated body formed on a central axis bisected longitudinally by a central longitudinal reference plane and having a top side surface and a bottom side surface leading axially from a rearward end to a forward section and a reduced front end;
   flotation in the forward section;
   a fish line receiving way with an axis within the reference plane extending along the top side surface;
   a top rudder plate member extending radially from the body and centered on the reference plane;
   a pair of elongated wings extending outwardly from the body to axial side edges, said wings including consistent cross sectional configurations extending axially between the forward section and the rearward end;
   a bottom rudder plate member extending radially from the body and centered on the reference plane and extending axially along the body; and
   line clamp means spaced radially outward of the body and longitudinally bisected by the reference plane for releasably receiving and securing a fish line therein.

16. The fish line rudder as claimed by claim 15 wherein the top rudder plate member includes a longitudinal groove along the fish line receiving way.

17. The fish line rudder as claimed by claim 15 wherein the fish line receiving way is defined by forward and rearward receiver members at respective forward and rearward sections of the body for axially, slidably receiving fish line therein.

18. The fish line rudder as claimed by claim 15 wherein the body is substantially cylindrical in cross sectional configuration between the forward tapered section and the rearward end and the flotation is comprised of a sealed airspace in the body in the forward section thereof.

19. A fish line rudder device, comprising:

an elongated body formed on a central axis and having a top side surface and a bottom side surface leading axially from a rearward end to a forward tapered section and a reduced front end;

a fish line receiver defining an open line receiving way extending along an axis along the body on one side thereof, for slidably receiving a fish line therethrough;

a top rudder member extending radially from the body and centered along a central longitudinal reference plane;

a pair of elongated wings extending in opposed directions outwardly from the body to side edges, said wings extending axially between the forward section and the rearward end;

a bottom rudder plate member extending radially from the body and centered on the central longitudinal reference plane;

wherein the top and bottom rudder plates extend axially along the body between the pair of elongated wings; and a line grip adjacent the bottom side surface of the body to releasably receive and secure a fish line therein.

* * * * *